United States Patent
Supino et al.

[11] Patent Number: 5,956,304
[45] Date of Patent: Sep. 21, 1999

[54] DIFFERENTIAL PHASE ERROR DETECTOR USING DUAL ARM CORRELATION FOR SERVO TRACKING IN AN OPTICAL DISK STORAGE DEVICE

[75] Inventors: Louis Supino; Paul M. Romano; Larry D. King; German S. Feyh, all of Boulder, Colo.

[73] Assignee: Cirrus Logic, Inc., Fremont, Calif.

[21] Appl. No.: 08/912,916

[22] Filed: Aug. 15, 1997

[51] Int. Cl.$^6$ ............................................. G11B 7/00
[52] U.S. Cl. ............................. 369/44.34; 369/44.41; 369/44.28
[58] Field of Search ............................. 369/44.27, 44.28, 369/32, 44.29, 44.41, 44.42, 44.34, 44.35

[56] References Cited

U.S. PATENT DOCUMENTS

| | | |
|---|---|---|
| 3,665,413 | 5/1972 | Walsh et al. . |
| 3,716,825 | 2/1973 | Walsh et al. . |
| 4,054,862 | 10/1977 | Backman, Jr. . |
| 4,282,589 | 8/1981 | Evetts et al. . |
| 4,404,665 | 9/1983 | van Heyningen . |
| 4,467,462 | 8/1984 | Shibata ................. 369/44.41 |
| 4,544,838 | 10/1985 | Musha et al. ........... 369/44.41 |
| 4,583,209 | 4/1986 | Bierhoff ................ 369/44.41 |
| 4,661,944 | 4/1987 | Van Sluys .............. 369/44.41 |
| 4,744,069 | 5/1988 | Sugiyama et al. ........ 369/44.29 |
| 4,849,764 | 7/1989 | van Heyningen . |
| 5,038,334 | 8/1991 | Uchikoshi et al. . |
| 5,130,963 | 7/1992 | Kusano et al. .......... 369/44.41 |
| 5,291,471 | 3/1994 | Russell . |
| 5,365,060 | 11/1994 | Shirai . |
| 5,444,682 | 8/1995 | Yamada et al. . |
| 5,508,991 | 4/1996 | Onigata et al. ......... 369/44.27 |
| 5,559,770 | 9/1996 | Hiroki et al. . |
| 5,602,820 | 2/1997 | Wickramasinghe et al. . |
| 5,793,720 | 8/1998 | Nishikata ............. 369/44.29 |
| 5,828,637 | 10/1998 | Kim .................. 369/44.41 |

*Primary Examiner*—Nabil Hindi
*Attorney, Agent, or Firm*—Howard H. Sheerin; Dan A. Shifrin

[57] ABSTRACT

In an optical disk storage device, a differential phase detector is disclosed for generating a position error signal independent of the frequency content of the recorded data. A pair if diagonal signals S1 and S2 are generated by adding a pair of respective quadrants of a four-quadrant photodetector, where the phase offset between the diagonal signals represents the position error of the pit image as it passes over the photodetector. The position error is determined in the present invention by computing the difference between a positive and negative correlation of the diagonal signals S1 and S2, otherwise referred to as a dual arm correlation (DAC)

$$PES = \sum_1^L S1(n) \otimes S2(n-\Delta) - \sum_1^L S2(n) \otimes S1(n-\Delta)$$

where $\Delta$ is the correlation offset and L is the correlation length. In the preferred embodiment, the correlation offset $\Delta$ is adaptively adjusted to maximize the correlation between S1 and S2. In this manner, the position error estimate is substantially insensitive to the frequency content of the recorded data. Furthermore, this method extends the position error over a range of plus or minus one-half a track, which facilitates generating a quadrature signal for use in counting track crossings during seek operations.

27 Claims, 9 Drawing Sheets

A pair of diagonal signals S1 and S2 are generated by adding a pair of respective quadrants of a four-quadrant photodetector, where the phase offset between the diagonal signals represents the position error of the pit image as it passes over the photodetector. The position error signal (PES) is determined in the present invention by computing the difference between a positive and negative correlation of

DIFFERENTIAL PHASE ERROR DETECTOR USING DUAL ARM CORRELATION FOR SERVO TRACKING IN AN OPTICAL DISK STORAGE DEVICE

FIELD OF INVENTION

The present invention relates to servo control in an optical disk storage device (such as compact disk (CD), digital video disk (DVD), etc.), particularly to a differential phase error detector that generates a position error signal for tracking and a quadrature signal for seeking.

BACKGROUND OF THE INVENTION

Optical disk drives, such as compact disks (CDs) and digital video disks (DVDs), are commonly used for storing large amounts of digital data on a single disc for use in audio/video or computer applications, and the like. The data on an optical disc is typically recorded as a series of "pits" arranged in tracks, where the length of the pit determines the presence of a digital "0" bit or a "1" bit. To read this recorded data, a servo system focuses a laser beam onto the surface of the disc such that the characteristics of the reflected beam allow detection of the data pits.

To this end, the servo system performs four operations: (1) a capture operation to "pull-in" the initial focus position, (2) a seek operation to move the beam radially over the surface of the disk to a desired track, (3) a centerline tracking operation to maintain the beam over the centerline of the selected track while reading the recorded data, and (4) a focus tracking operation to maintain proper will focus as the disk spins over the beam.

Conventional optical disk drives use a head assembly comprised of a laser diode for generating the laser beam which is focused onto the surface of the optical disk through an objective lens. FIG. 1 illustrates a typical optical head assembly, the operation of which is well known by those skilled in the art. A laser diode 1 produces a light beam 2 which passes through a polarization beam splitter 3 and a collimator lens (not shown). The light beam 2 is then reflected by a prism 4, through an object lens (OL) 5, and onto the surface of the optical disk (not shown). The beam 2 reflects off the optical disc, again passes through the OL 5, and then reflects off prism 4 back toward the polarization prism 3 which deflects the beam 2 onto a four-quadrant photodetector 6. The signals output by the four-quadrant photodetector 6 are used to generate a focus error signal for focusing the OL 5 and a tracking error signal for tracking the centerline of the selected track. The four-quadrant photodetector 6 also generates an RF read signal for reading the recorded data.

In order to position the read head over a selected track during a seek operation, the entire sled assembly 8 slides radially along a lead screw 9 underneath the optical disc until the read head is positioned near the desired track. This coarse positioning (or coarse seeking) is accomplished by rotating the lead screw 9 in a clockwise or counterclockwise direction. Once near the selected track, OL voice coil motors (VCMs) (10A,10B) rotate an OL carriage unit 11 about a plastic hinge 12 in a "fine seeking" operation until the OL 5 is positioned directly over the desired track. Then, as the disk rotates and the track passes under the read head, the OL VCMs (10A,10B) perform fine adjustments in a "tracking" operation in order to maintain the position of the OL 5 over the centerline of the selected track as information is read from the disc.

The OL VCMs (10A,10B) also move the OL carriage unit 11 up and down in the direction shown in order to "capture" and "track" the OL 5 focus position. For focus capture and focus tracking the four-quadrant photodetector 6 generates an astigmatic focus error signal indicative of the distance between the OL 5 and the optical disc. At the beginning of a capture operation, the OL carriage unit 11 is initially positioned sufficiently away from the disc so that it is out of focus. Then the OL VCMS (10A,10B) slowly move the OL carriage unit 11 toward the disc with the focus servo loop open until the quadrant photodetector 6 indicates that the OL 5 is within its focus pull-in range. Once within the pull-in range, the focus servo loop is closed and the initial focus point is captured. Thereafter, the OL VCMs (10A,10B) track the in-focus position in response to the astigmatic focus error signal as the read head seeks to selected tracks and reads data from the disc.

Several methods have been employed in the prior art for generating the tracking error signal used to maintain the optical transducer over the centerline of the selected track during a read operation. One method, referred to as differential phase detection (DPD), measures the phase offset between a pair of diagonal signals generated by the four-quadrant photodetector 6 to determine the position error as illustrated in FIG. 2A–2C. It should be noted that other types of photodetectors, such as a holographic photodetector, could be used to generate the diagonal signals. FIG. 2A shows three situations when the pit image is detected by the photodetector 6: left of center, at the center, and right of center. FIG. 2B shows the resulting diagonal signals generated by adding the (A+C) quadrants and the (B+D) quadrants, where the phase difference between these signals represents the position error. The position error signal (PES) is computed by converting the diagonal signals (A+C) and (B+D) into polarity square waves, as shown in FIG. 2C, and then extracting the offset or time difference between the square waves. The time difference is then integrated to generate the tracking error signal applied to the OL VCMs (10A,10B).

A problem with the above-described prior art method for generating the tracking error signal is that the differential phase error detector is dependent on the spectral content of the data being read from the disk. Thus, the randomness of the recorded data results in gain variance in the servo tracking loop; to compensate for the gain variance, the tracking servo loop is normally operated at a low (sub-optimal) bandwidth. Another drawback of prior art differential phase error detectors is a phenomenon known as "lens shift", an effective skew introduced into the diagonal signals due to generating the position error signal in continuous time.

There is, therefore, a need for an improved differential phase detector for optical disk storage devices that can generate the tracking error signal independent of the frequency content of the recorded data so that the bandwidth of the tracking servo loop can be increased to enhance performance. Another object of the present invention is to overcome the "lens shift" problem inherent in continuous time differential phase error detectors. Still another object of the present invention is to provide a differential phase error detector that can also generate a pseudo quadrature signal for use in counting track crossings during a seek operation.

SUMMARY OF THE INVENTION

In an optical disk storage device, a differential phase detector is disclosed for generating a tracking error signal independent of the frequency content of the recorded data.

the diagonal signals S1 and S2, otherwise referred to as a dual arm correlation (DAC)

$$PES = \sum_{1}^{L} S1(n) \otimes S2(n-\Delta) - \sum_{1}^{L} S2(n) \otimes S1(n-\Delta)$$

where $\Delta$ is the correlation offset and L is the correlation length. In the preferred embodiment, the correlation offset $\Delta$ is adaptively adjusted to maximize the correlation between S1 and S2. In this manner, the position error estimate is substantially insensitive to the frequency content of the recorded data. Furthermore, this method extends the position error over a range of plus or minus one-half a track, which facilitates generating a quadrature signal for use in counting track crossings during seek operations.

BRIEF DESCRIPTION OF THE DRAWINGS

The above and other aspects and advantages of the present invention will be better understood by reading the following detailed description of the invention in view of the drawings, wherein.

DETAILED DESCRIPTION OF THE PREFERRED EMBODIMENT

Dual Arm Correlator

Figure 1:
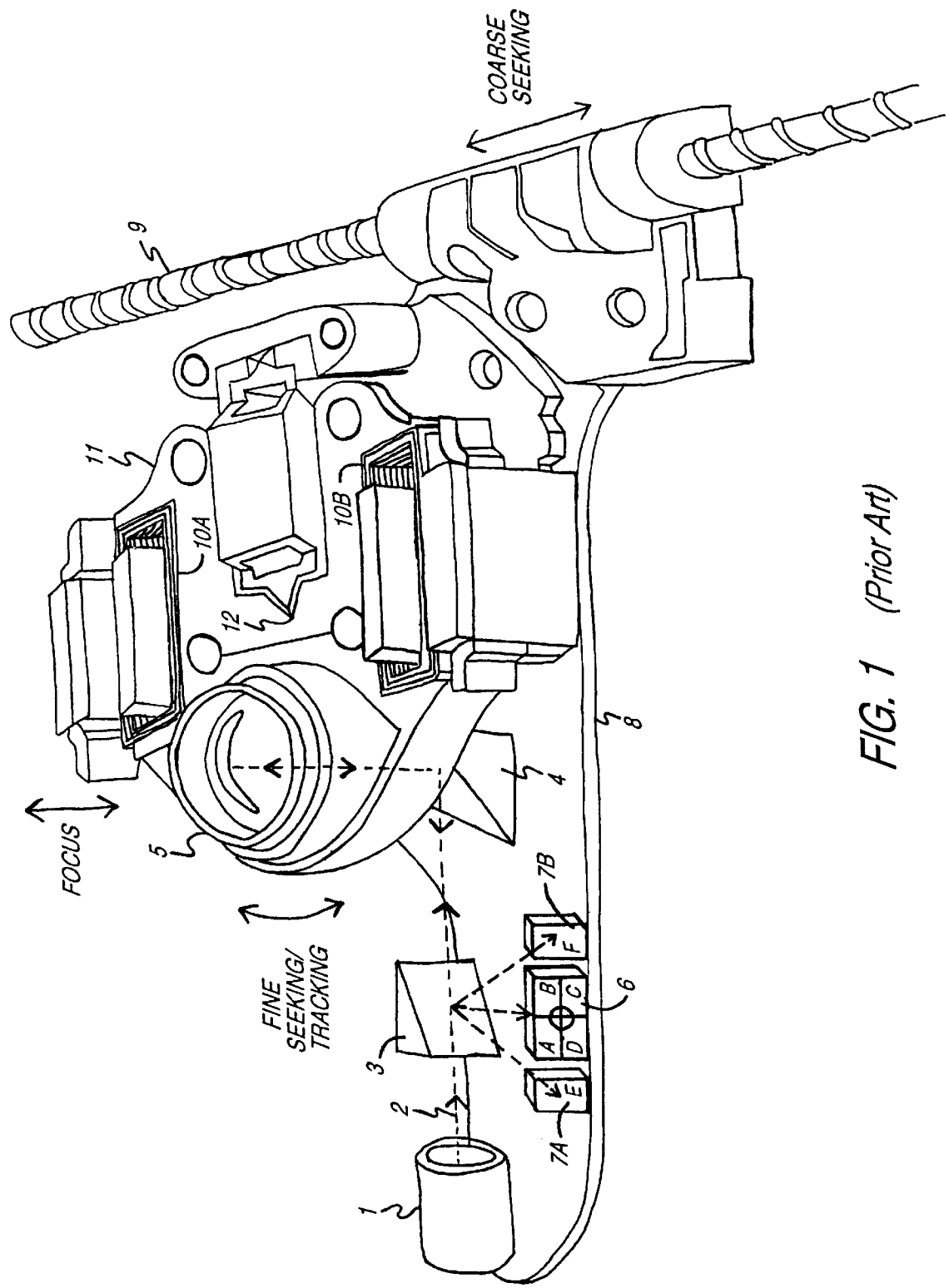
FIG. 1 shows a conventional optical head assembly positioned radially over the disk by means of a lead screw and optical carriage, where the tracking error signal (TES) is computed using the output of a four-quadrant photodetector.
Figure 2A:
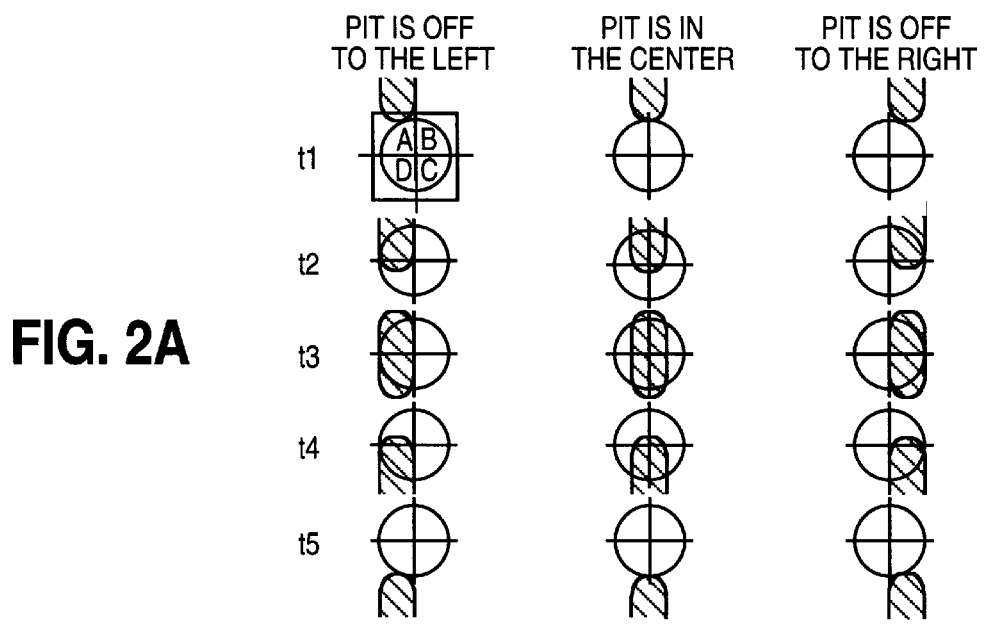
FIG. 2A–2C illustrate operation of a conventional differential phase error detector for computing the position error during tracking.
Figure 2B:
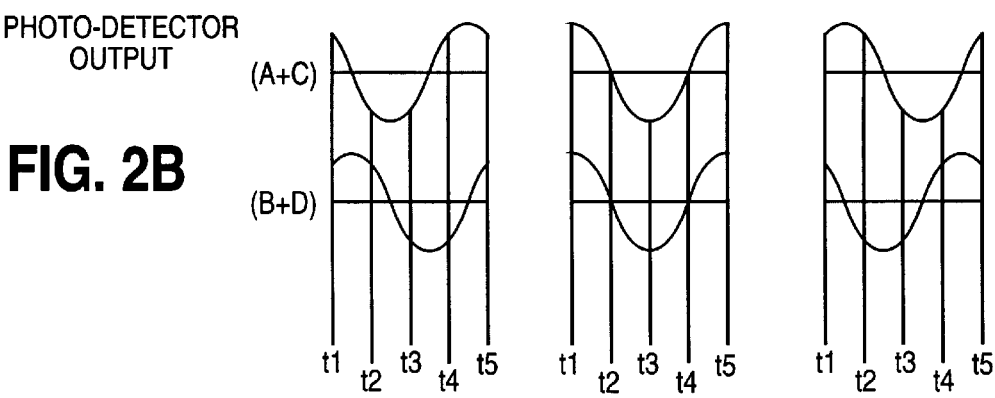
Figure 2C:
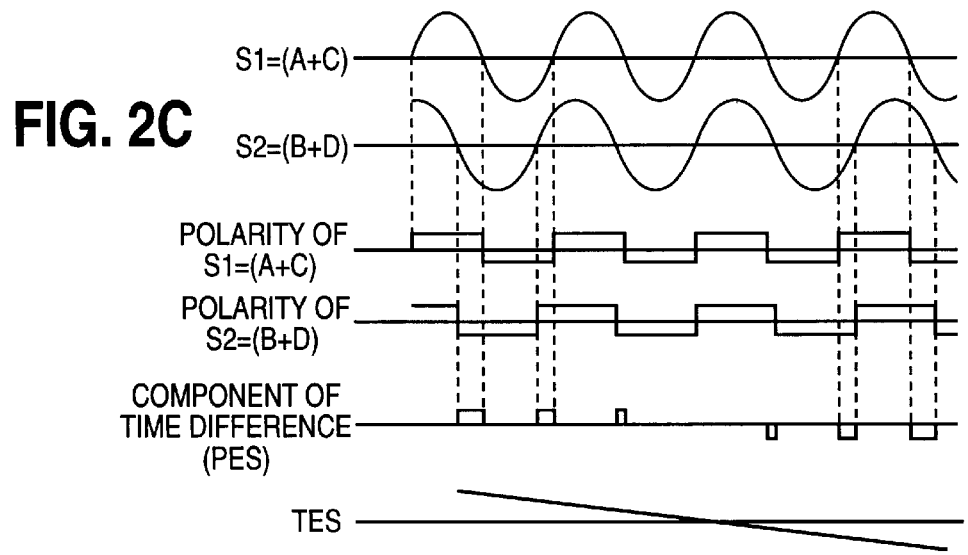

In general, the present invention determines the position error signal for use during tracking by computing a dual arm correlation of the diagonal signals S1 and S2 output by the four-quadrant photodetector shown in FIG. 2C. In the preferred embodiment, the diagonal signals S1 and S2 are sampled and converted into binary signals S1(n) and S2(n). The dual arm correlation (DAC) is computed as the difference between a positive correlation and a negative correlation of the diagonal signals S1(n) and S2(n) at a predetermined correlation offset $\Delta$ $$DAC(\Delta) = \sum_{1}^{L} S1(n) \otimes S2(n-\Delta) - \sum_{1}^{L} S2(n) \otimes S1(n-\Delta)$$

where the first term represents the positive correlation and the second term represents the negative correlation. In the above equation, L is the length of the correlation which is carried out by summing the XNOR (i.e., $\overline{XOR}$ denoted $\otimes$) of the corresponding L-bits in the binary signals S1(n) and S2(n).

Figure 3A:
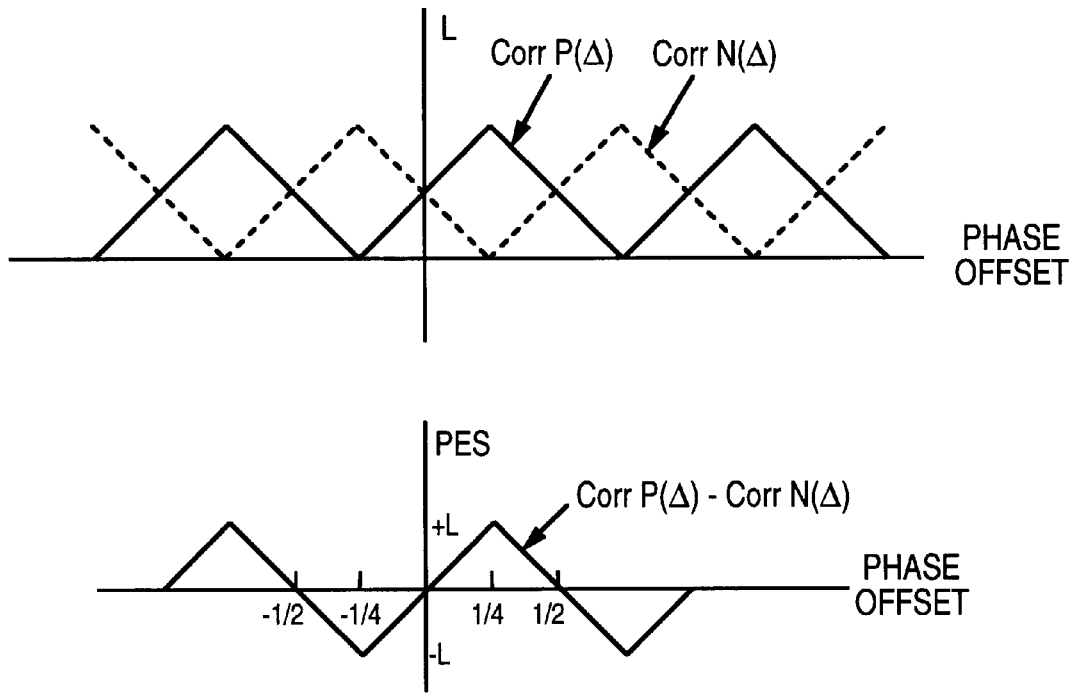
FIG. 3A shows the waveforms according to the dual arm correlation technique of the present invention for generating the position error signal during tracking.

FIG. 3A shows the waveforms corresponding to the positive correlation CorrP($\Delta$) and the negative correlation CorrN($\Delta$), as well as the resulting position error signal (PES) computed as the difference between the positive and negative correlations. The x-axis represents the phase offset between the diagonal signals S1 and S2, which is also the position error. In this embodiment, the correlation offset $\Delta$ remains fixed at approximately ¼ the period of S1 and S2. Notice that the maximum range of PES in this embodiment is only plus or minus one-quarter of a track. If the correlation offset is not set to ¼ the period of S1 and S2, or if the frequency of S1 and S2 drift due to variations in angular velocity of the disk, then the maximum track range for PES is reduced even further. Furthermore, because the correlation offset $\Delta$ is fixed, the positive and negative correlations are sensitive to the frequency content of the recorded data which results in undesirable gain variance similar to the prior art differential phase error detectors described above.

Adaptive Dual Arm Correlator

Figure 3B:
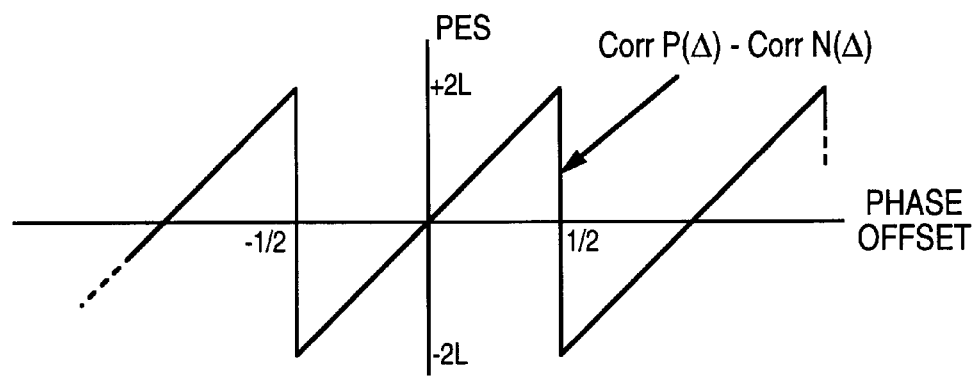
FIG. 3B shows the waveforms according to the adaptive dual arm correlation technique of the present invention which is insensitive to the frequency content of the recorded data and provides an increase in range to plus or minus one-half a track.

In order to increase the range of the PES to one-half a track, as well as compute the PES in a manner that is insensitive to the frequency content of the recorded data, the present invention employs an adaptive dual arm correlator (ADAC). The ADAC of the present invention adaptively adjusts the correlation offset $\Delta$ in order maximize the correlation between S1 and S2. In this manner, the instantaneous correlation offset $\Delta$ represents the phase offset between the diagonal signals S1 and S2 over a range of plus or minus one-quarter of a track, and the difference between the positive and negative correlations CorrP($\Delta$) and CorrN($\Delta$) represents the phase offset (i.e, PES) over a range extending to plus or minus one-half of a track as shown in FIG. 3B. Additionally, the ADAC of the present invention is substantially insensitive to the frequency content of the recorded data which allows for a higher servo tracking bandwidth due to a reduction in gain variance.

Figure 4:
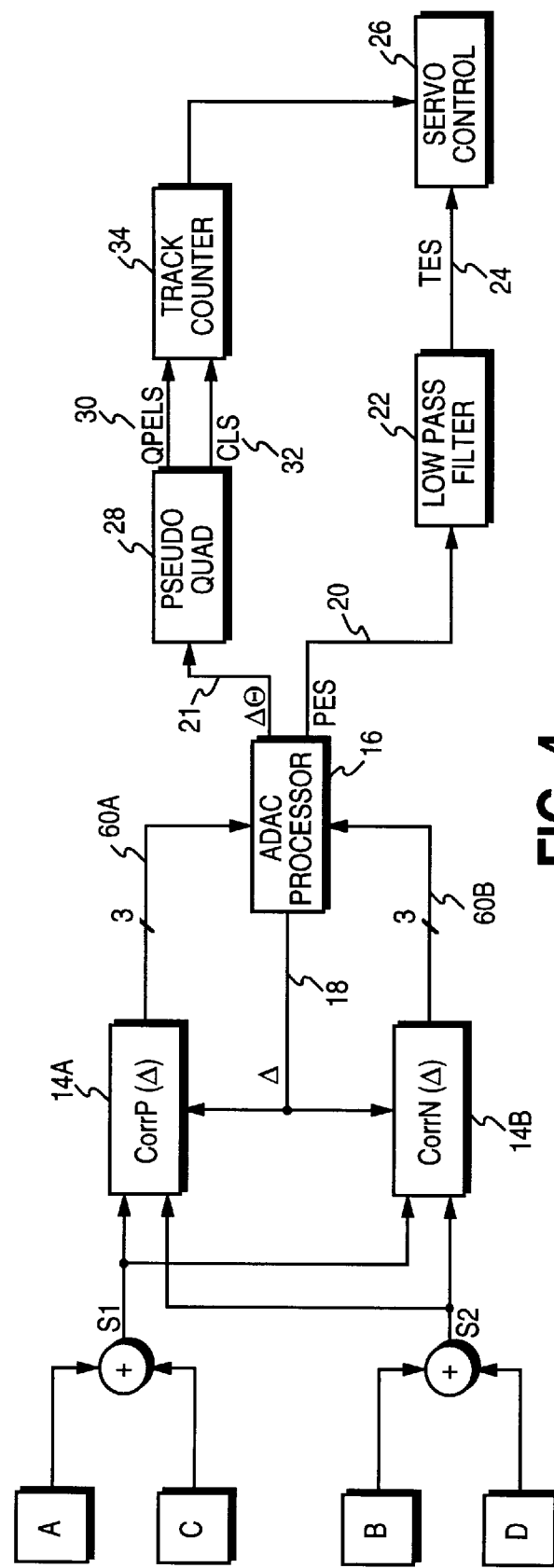
FIG. 4 is a block diagram of the adaptive dual arm correlator of the present invention.

FIG. 4 shows a block diagram overview of the ADAC differential phase error detector of the present invention. The quadrants A and C of the photodetector are added to generate the diagonal signal S1, and the quadrants B and D are added to generate the diagonal signal S2. The diagonal signals S1 and S2 are then input into a positive correlator CorrP($\Delta$) 14A and a negative correlator CorrN($\Delta$) 14B, both of which generate three correlation signals which are input into an ADAC processor 16 for use in computing the updated correlation offset $\Delta$ 18 as described in more detail below with reference to the flow diagram of FIG. 7. The ADAC processor computes the PES 20 as the difference between the positive and negative correlations. The PES 20 is low pass filtered 22 to generate a tracking error signal (TES) 24 input into a servo controller 26 for positioning the optical transducer over the centerline of the selected track during read operations. The ADAC processor 16 also generates a phase offset signal $\Delta\Theta$ 21 representing the phase offset between diagonal signals S1 and S2. A pseudo quadrature signal generator 28 processes the phase offset signal 21 to generate a position error logic signal (QPELS) 30 and a centerline logic signal (CLS) 32 for use by a track counter 34 in counting track crossings during seek operations.

Figure 5:
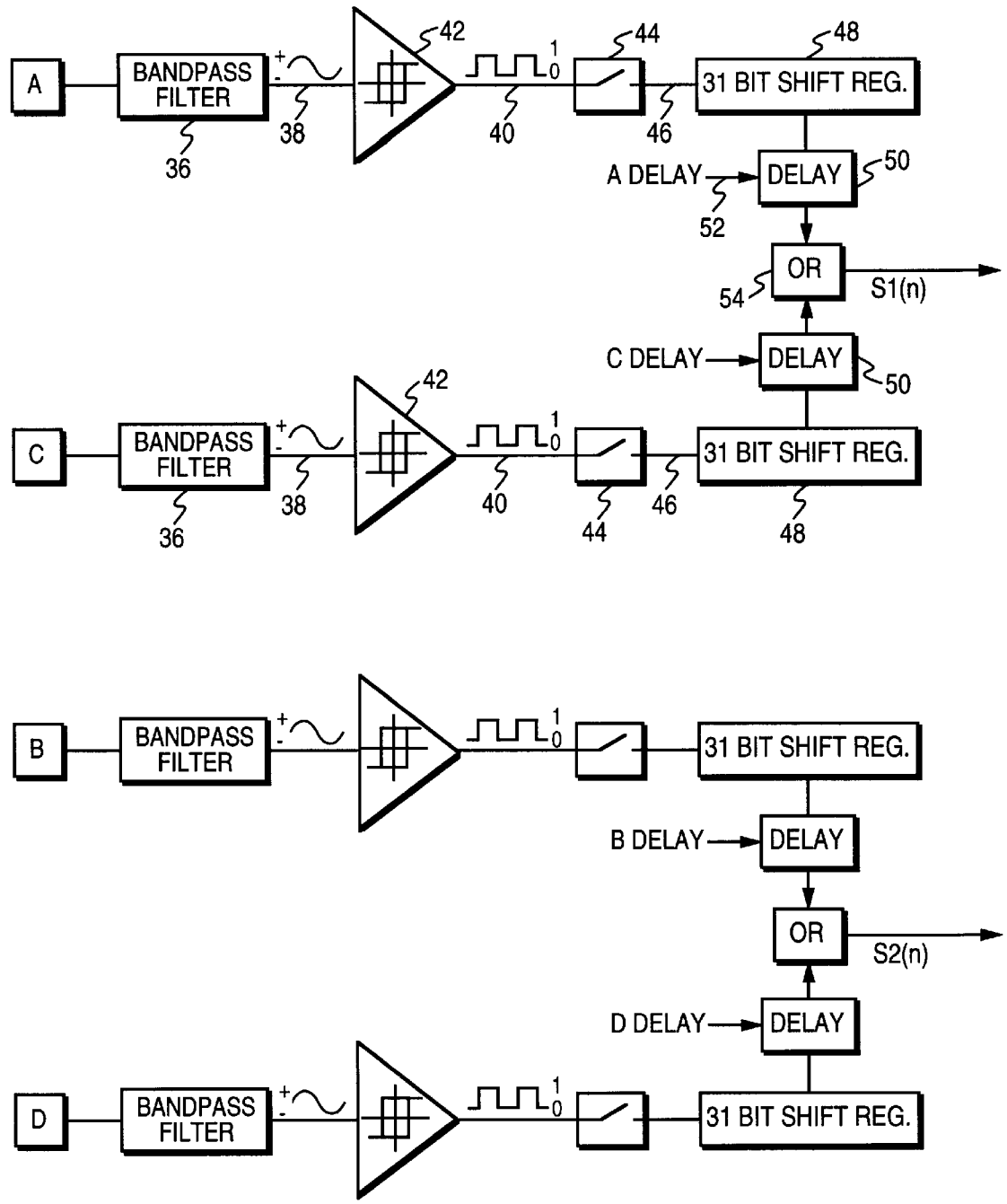
FIG. 5 shows details on the preferred embodiment for sampling the four-quadrant photodetector signals and for generating the diagonal signals S1 and S2.

Referring now to FIG. 5, shown is the preferred embodiment for the front-end circuitry for sampling the photodetector signals A, B, C, and D, and generating the diagonal signals S1(n) and S2(n). A bandpass filter 36 filters the photodetector signals to attenuate the DC component (including the track crossing frequency) and to attenuate aliasing noise. The sinusoidal signals 38 output by the bandpass filter 36 are converted into polarity square wave signals 40. The conversion is achieved by passing the sinusoidal signals 38 through polarity comparators 42 that use hysteresis to prevent extraneous pulses in the output around the zero crossings. The polarity square waves are then sampled 44 and converted into binary square wave signals 46 that are shifted into 31-bit shift registers 48. The shift registers 48 allow the user to selectively delay the photodetector signals with respect to one another in order to calibrate the servo control system according to the particular characteristics of the storage device. The delay elements 50 are implemented as a multiplexer for selecting the appropriate output of the shift registers 48 according to the delay value asserted over control line 52. The diagonal signals S1(n) and S2(n) are then generated by ORing 54 the binary square wave signals output by the delay elements 50 to generate the signals (A+C) and (B+D), respectively. The diagonal signals S1(n) and S2(n) are then input into the positive and negative correlators CorrP($\Delta$) 14A and CorrN($\Delta$) 14B of FIG. 4.

Figure 6:
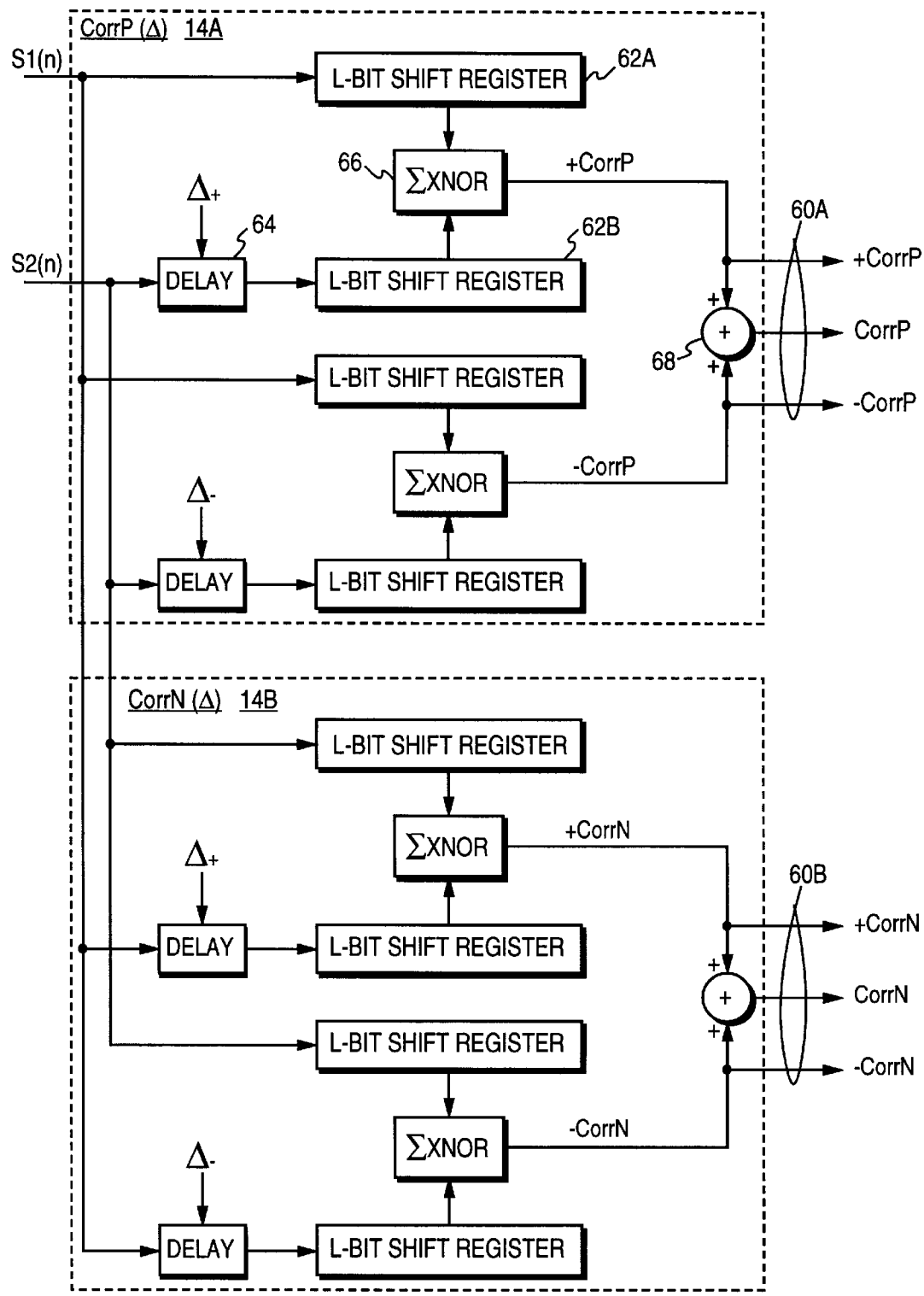
FIG. 6 shows details of the positive and negative correlators CorrP($\Delta$) and CorrN($\Delta$) which compute their respective correlations by adding adjacent correlations at $\Delta$+ and $\Delta$-.

Further details of the positive and negative correlators CorrP($\Delta$) 14A and CorrN($\Delta$) 14B are shown in FIG. 6. Part of the adaptive algorithm is to compute two correlations separated by a predetermined offset for each of the positive and negative arms designated ±CorrP and ±CorrN. The correlation offset $\Delta$ is then adaptively adjusted in a direction that maximizes the positive or negative correlation as described below. Thus, the positive correlator CorrP($\Delta$) 14A computes +CorrP according to a correlation delay $\Delta$+, and computes a positive correlation –CorrP according to a correlation delay $\Delta$–, where $\Delta$– is slightly smaller than $\Delta$+. Similarly, the negative correlator CorrN($\Delta$) 14B computes negative correlations +CorrN and –CorrN using the correlation offsets $\Delta$+ and $\Delta$–, respectively.

To compute the correlation signal +CorrP, the diagonal signal S1(n) is shifted undelayed into a first L-bit shift register 62A and the diagonal signal S2(n) is shifted into a second L-bit shift register 62B after being delayed by $\Delta$+ 64. The length L of the shift registers determines the length of the correlation. The correlation signal +CorrP is generated by summing the XNOR 66 of the corresponding bits stored in the shift registers 62A and 62B, where XNOR (denoted ⊗) is an inverted XOR function $$+CorrP(\Delta+) = \sum_{1}^{L} S1(n) \otimes S2(n - \Delta+).$$

Similar circuitry is provided to generate the correlation signal –CorrP using $\Delta$– as the correlation offset. The correlation signals +CorrP and –CorrP are then added at adder 68 to generate the positive correlation signal CorrP.

The negative correlator 14B for computing the negative correlation signals +CorrN, –CorrN and CorrN comprises the same circuitry as the positive correlator 14A of FIG. 6 except that S2(n) is undelayed and S1(n) is delayed by the correlation offsets $\Delta$+ and $\Delta$–.

In the preferred embodiment, the correlation is computed at a frequency of once per L/4 bits shifted into the shift registers. That is, the correlation frequency is 4/L times the sampling frequency of the diagonal signals S1 and S2 such that each correlation is computed with L/4 new samples of S1(n) and S2(n). The length and frequency of the correlation can be programmably adjusted in order to optimize the phase error detector based on system dynamics such as the linear velocity of the disk at a particular track.

Figure 7:
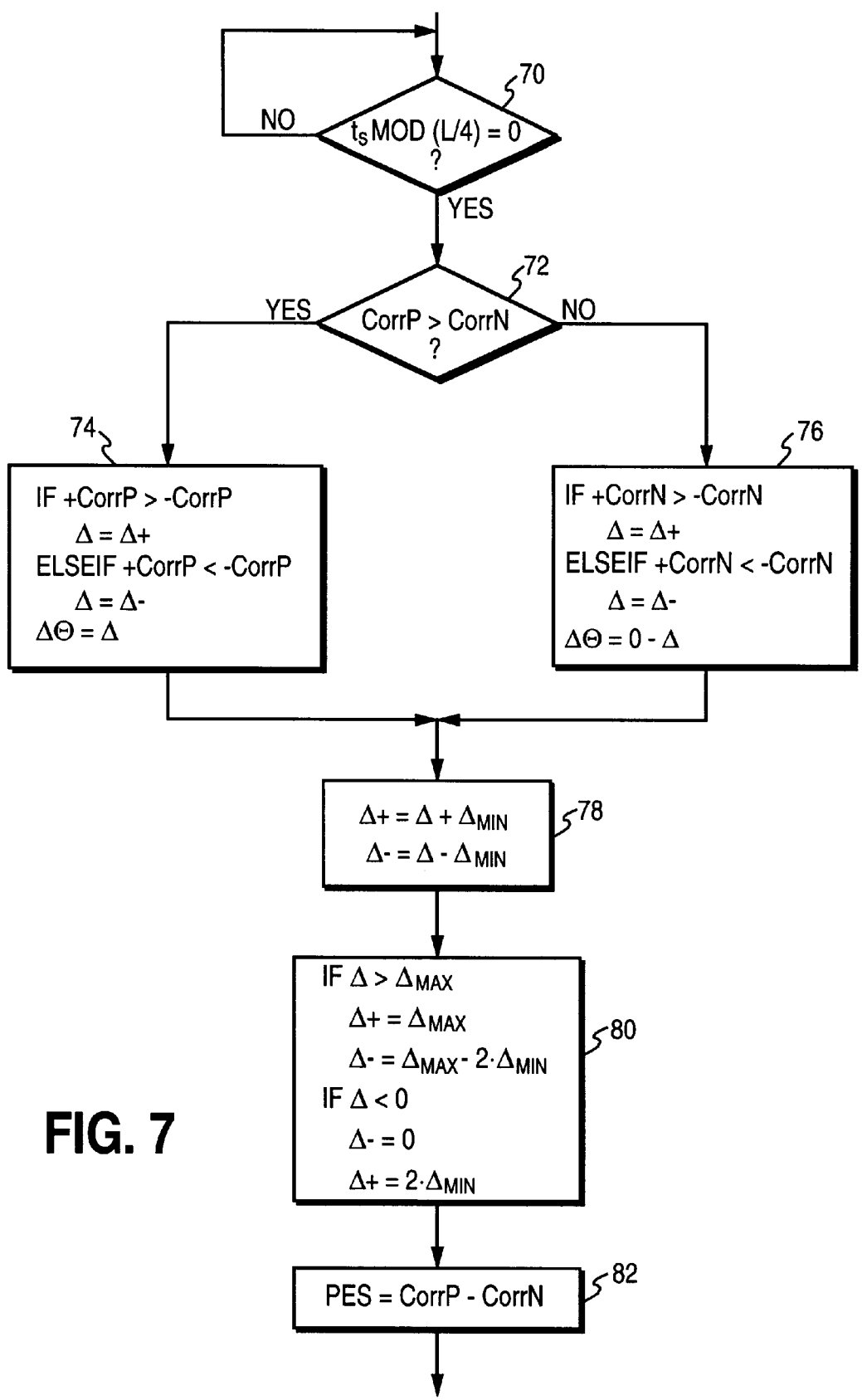
FIG. 7 is a flow diagram showing how the correlation offset $\Delta$ is adaptively adjusted to maximize the positive or negative correlations.

The positive correlation signals (+CorrP, CorrP, –CorrP) 60A and the negative correlation signals (+CorrN, CorrN, –CorrN) 60B are transferred to the ADAC processor 16 of FIG. 4 which computes the updated correlation offsets $\Delta$+ and $\Delta$– according to the flow diagram shown in FIG. 7. The flow diagram of FIG. 7 updates the correlation offsets $\Delta$+ and $\Delta$– in a direction that will maximize the positive or negative correlation values CorrP or CorrN. At step 70, the ADAC processor waits in a loop for the next correlation period (i.e., when the sampling periods $t_s$ modulo divided by L/4 equals zero). Then at step 72, the magnitude of the positive and negative correlation signals CorrP and CorrN are compared. If CorrP is greater than CorrN, then at step 74 the correlation offset $\Delta$ is updated to $\Delta$+ or $\Delta$– according to the maximum between +CorrP and –CorrP. If CorrP is less than CorrN, then at step 76 the correlation offset $\Delta$ is updated to 66 + or $\Delta$– according to the maximum between +CorrN and –CorrN. Also at steps 74 and 76, the phase offset $\Delta\Theta$ between the diagonal signals s1(n) and S2(n) is saved and used to compute the quadrature signal for seeking as described below. At step 78, the correlation offsets $\Delta$+ and $\Delta$– are updated to the current value of $\Delta$ plus and minus a predetermined offset $\Delta_{MIN}$. If the updated correlation offsets are out of range, then at step 80 they are adjusted to a maximum or minimum value as necessary. Finally, the position error signal (PES) is computed as the difference between CorrP and CorrN at step 82.

Referring again to FIG. 4, the position error signal (PES) 20 is low pass filtered 22 to generate a tracking error signal (TES) 24 used by the servo controller 26 for positioning the optical transducer over a centerline of the selected track during read operations. The ADAC processor 16 also transmits the phase offset $\Delta\Theta$ 21 between S1(n) and S2(n) to the quadrature signal generator 28 which generates quadrature signals QPELS 30 and CLS 30 for counting track crossings during seek operations.

Figure 8A:
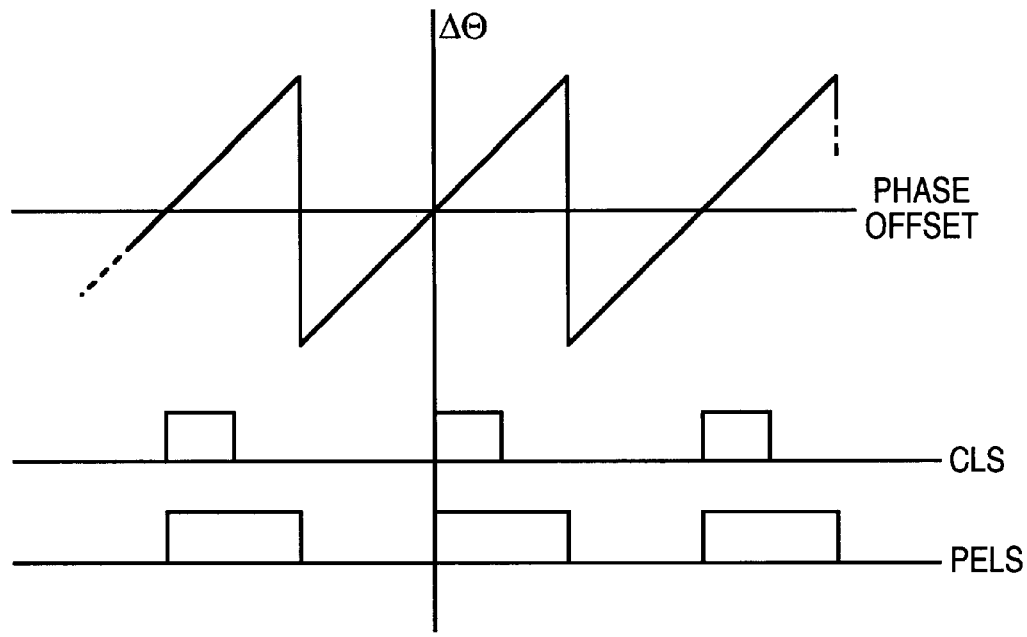
FIG. 8A–8D illustrate how the quadrature signal used for counting track crossings when seeking is generated using the correlation offset $\Delta$.
Figure 8B:
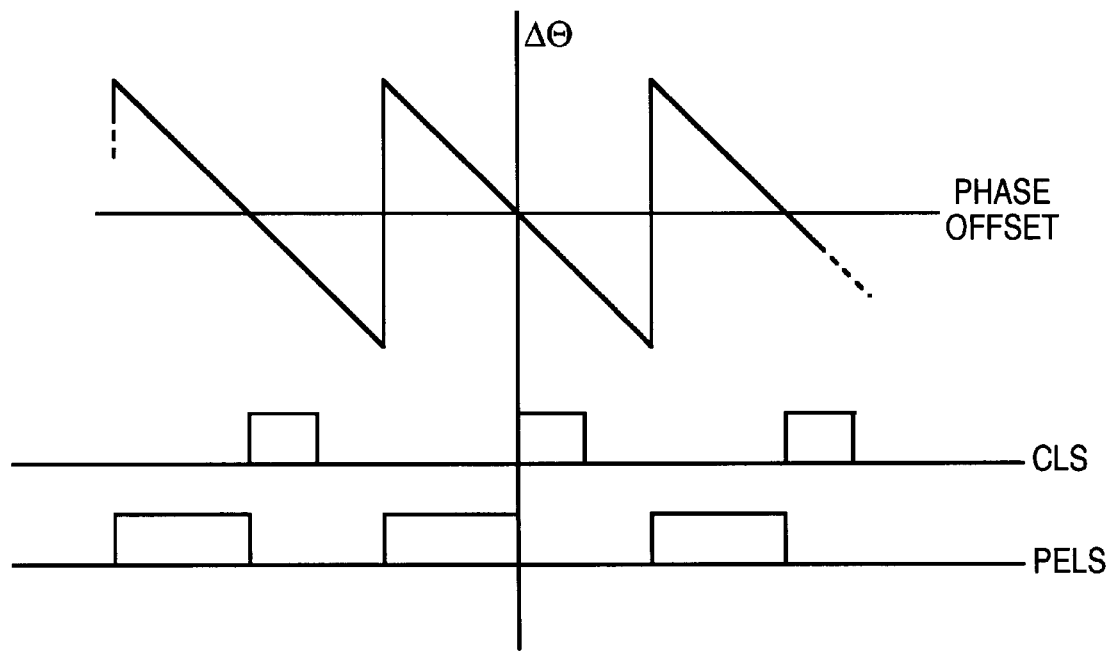

The operation of the quadrature signal generator 28 is understood with reference to FIG. 8A and 8B which show a phase offset $\Delta\Theta$, centerline logic signal (CLS) and position error logic signal (PELS) for a forward seek and a reverse seek, respectively, as the optical transducer crosses over the tracks. If the velocity of the optical transducer is below the worst case runout velocity, then the position error logic signal (PELS) is updated by executing the following pseudo code:

--- if ($\Delta\Theta$ (i) >0) & ($\Delta\Theta$ (i–1) >0) & ($\Delta\Theta$ (i) <0.5*$\Delta\Theta_{max}$) & ($\Delta\Theta$ (i–1) <0.5*$\Delta\Theta_{max}$)
   PELS (i) =1.;
elseif ($\Delta\Theta$ (i) <0) & ($\Delta\Theta$ (i–1) <0) & ($\Delta\Theta$ (i) >–0.5*$\Delta\Theta_{max}$) & ($\Delta\Theta$ (i–1) >–0.5*$\Delta\Theta_{max}$)
   PELS (i) =0.;
else
   PELS (i) =PELS(i–1);

---

The above pseudo code performs the following operations. If the phase error $\Delta\Theta$ is greater than zero and less than 0.5*$\Delta\Theta_{max}$ for two correlation periods, then PELS is set to 1 as seen in FIG. 8A. Conversely, if the phase offset $\Delta\Theta$ is less than zero and greater than –0.5*$\Delta\Theta_{max}$ for two correlation periods, then the PELS is set to 0. Otherwise, PELS is left unchanged by setting it to the prior PELS value. Evaluating the polarity of the phase error $\Delta\Theta$ for two correlation periods as well as against the maximum and minimum limits of $\pm 0.5*\Delta\Theta_{max}$ introduces hysteresis into generating the PELS signal so that extraneous pulses are avoided near the zero crossings. If the velocity of the optical transducer is above the predetermined threshold (i.e., during a seek operation), then it is not necessary to check the phase offset against the maximum and minimum limits $\pm 0.5*\Delta\Theta_{max}$ (i.e., the PELS is updated over the entire saw tooth waveform of FIG. 8A except near the centerline zero crossing).

The quadrature signal generator 28 then executes the following source code:

```
if (abs (ΔΘ (i) -ΔΘ (i-1) ) >1.5*ΔΘmax) & (PELS (i) ==1)
   seek (i) =1;
elseif (abs (ΔΘ (i) -ΔΘ(i-1) ) >1.5*ΔΘmax) & (PELS (i) ==0)
   seek (i) =0;
``` which determines the seek direction of the optical transducer (i.e., forward or reverse seek). During a forward seek PELS will be 1 when the phase offset $\Delta\Theta$ transitions from $+\Delta\Theta_{max}$ to $-\Delta\Theta_{max}$ as shown in FIG. 8A, and during a reverse seek PELS will be 0 when the phase offset $\Delta\Theta$ transitions from $-\Delta\Theta_{max}$ to $+\Delta\Theta_{max}$ as shown in FIG. 8B.

The centerline logic signal (CLS) is generated according to the following pseudo code:

```
PELS_CHANGED = (PELS (i) != PELS (i-1) );
if (PELS_CHANGED) & (seek (i) ==1) & (PELS (i) -PELS (i-1)
==1) {
   CLS (i) =1;
   clcnt=0;
   clwidth=0;
}
elseif (PELS_CHANGED) & (seek (i) ==0) & (PELS (i)-PELS (i-1)
==-1) {
   CLS (i)=1;
   clcnt=0;
   clwidth=0;
}
if (clpulse<4) {
   CLS(i)=1;
   clwidth=clwidth+1;
}
else
   CLS (i) =0;
```

The above pseudo code performs the following operations. The flag PELS_CHANGED indicates whether the PELS signal has changed (i.e, transitioned from 0→1 or from 1→0). If during a forward seek the PELS changes such that PELS(i)-PELS(i-1) is 1, then the CLS signal is set to 1 indicating that the phase offset $\Delta\Theta$ crossed zero due to the optical transducer crossing over the centerline of the track. Similarly, if during a reverse seek the PELS changes such that PELS(i)-PELS(i-1) is -1, then the CLS signal is set to 1 indicating that the phase offset $\Delta\Theta$ crossed zero due to the optical transducer crossing over the centerline of the track. The centerline count (clcnt) keeps track of the amount of time that transpires between centerline pulses and is used to force a centerline pulse if a centerline crossing is not detected within a predetermined time limit; clcnt is reset to zero when a centerline crossing is detected. The counter centerline width (clwidth) determines the pulse width of the centerline pulse; it is reset to zero when a centerline crossing is detected. The CLS signal remains 1 until the clwidth counter increments past four, then the CLS signal is reset to 0. That is, the width of the centerline pulse is four correlation time periods.

The pseudo code for forcing a centerline pulse when the counter clcnt exceeds the time limit is shown below:

```
if (PELS_CHANGED) {
   if (clcnt>1.5*pcnt) {
      CLS (i)=1;
      clcnt=0;
      clwidth=0;
   }
   pcnt = 0
}
else
   pcnt=pcnt+1;
```

The period count (pcnt) tracks the length of a half-period of the PELS signal by counting the cycles between when the PELS signal changes (PELS_CHANGED). If the counter clcnt exceeds 1.5*pcnt (1.5 times the half-period of PELS), then a centerline pulse is forced by setting CLS to 1 and resetting the clcnt and clwidth counters to zero.

Figure 8C:
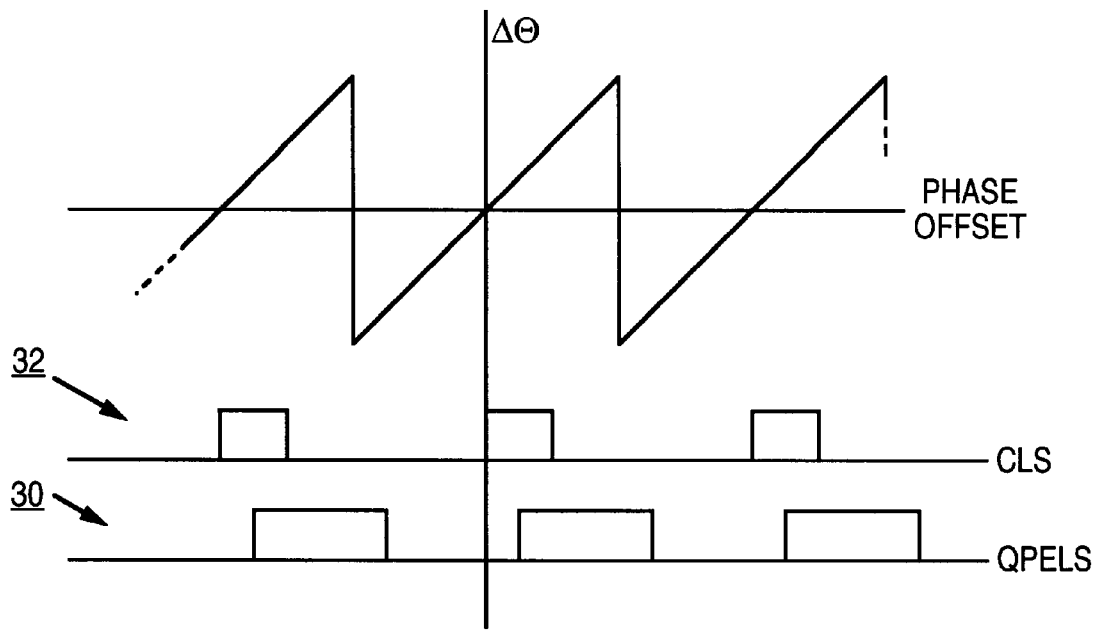
Figure 8D:
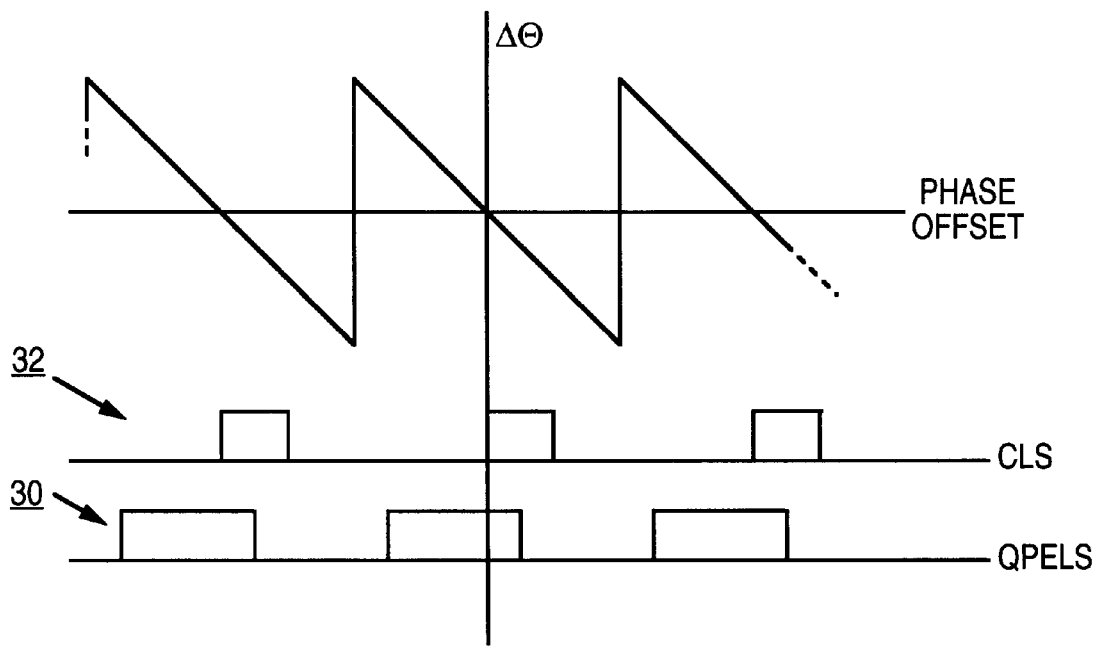

If a centerline crossing is not detected and not forced, then clcnt is simply incremented. In order to generate the quadrature signal (a signal with four states per track crossing), the PELS signal is delayed by two correlation periods as shown in FIG. 8C and 8D for the forward and reverse seek, respectively. The pseudo code for incrementing clcnt and delaying PELS to generate QPELS 30 is shown below.

clcnt=clcnt+1;

QPELS(i)=PELS(i-2);

Thus, the pseudo quadrature signal generator 28 generates the CLS signal 32 and the QPELS signal 30 shown in FIG. 8C and 8D for use by the track counter 34 of FIG. 4 for counting the track crossings during seek operations.

The objects of the invention have been fully realized through the embodiments disclosed herein. Those skilled in the art will appreciate that the various aspects of the invention can be achieved through different embodiments without departing from the essential function. The particular embodiments disclosed are illustrative and not meant to limit the scope of the invention as appropriately construed by the following claims.

We claim:

1. In an optical storage device for recording digital data, a differential phase error detector for generating a tracking error signal in response to a light-beam reflected off of an optical storage medium, the light-beam generated by an optical transducer, the differential phase error detector comprising:

(a) a photodetector, responsive to the light-beam, for generating a first and second position signals S1 and S2; and (b) a correlator for correlating the first and second position signals S1 and S2 to generate a position error signal indicative of the optical transducer's position relative to a centerline of a selected track wherein:

the first and second position signals S1 and S2 are discrete-time signals S1(n) and S2(n); and the correlator computes a correlation corr($\Delta$) according to $$corr(\Delta) = \sum_{1}^{L} S1(n)S2(n - \Delta)$$

where L is an integer representing the length of the correlation and $\Delta$ is an integer representing a time shift between S1(n) and S2(n).

2. The differential phase error detector as recited in claim 1, wherein:
(a) the photodetector comprises four quadrants;
(b) the first position signal S1 is generated as a function of a first two quadrants of the photodetector and the second position signal S2 is generated as a function of a second two quadrants of the photodetector;
(c) the digital data is recorded by altering a characteristic of the optical storage medium such that the light-beam reflecting off the altered medium generates an image that passes over the photodetector; and
(d) a phase offset occurs between the first and second position signals S1 and S2 when the image passes disproportionately over the four quadrants.

3. The differential phase error detector as recited in claim 1, wherein:
(c) the correlator computes a first correlation value corr$(\Delta)_1$ and a second correlation value corr$(\Delta)_2$; and
(d) the position error signal is generated as a function of corr$(\Delta)_1$ and corr$(\Delta)_2$.

4. The differential phase error detector as recited in claim 3, wherein the position error signal is generated as a difference between corr$(\Delta)_1$ and corr$(\Delta)_2$.

5. The differential phase error detector as recited in claim 1, wherein $\Delta$ is programmably adjusted to maximize the correlation corr$(\Delta)$.

6. The differential phase error detector as recited in claim 1, wherein:
(a) the first and second position signals S1 and S2 are discrete-time signals S1(n) and S2(n); and
(b) the correlator computes a positive correlation corrP$(\Delta)$ according to $$corrP(\Delta) = \sum_{1}^{L} S1(n)S2(n-\Delta)$$

and a negative correlation corrN$(\Delta)$ according to $$corrN(\Delta) = \sum_{1}^{L} S2(n)S1(n-\Delta)$$

where L is an integer representing the length of the correlation and $\Delta$ is an integer representing a time shift between S1(n) and S2(n).

7. The differential phase error detector as recited in claim 6, wherein the position error signal is generated as a difference between corrP$(\Delta)$ and corrN$(\Delta)$.

8. The differential phase error detector as recited in claim 6, wherein $\Delta$ is programmably adjusted in order to maximize a correlation value relative to corrP$(\Delta)$ and corrN$(\Delta)$.

9. The differential phase error detector as recited in claim 8, further comprising a quadrature signal generator for generating a quadrature signal for use in detecting when the light-beam cross over a track during a seek operation.

10. The differential phase error detector as recited in claim 9, wherein the quadrature signal comprises:
(a) a centerline signal indicating when the light-beam is within a predetermined distance from a centerline of the track; and
(b) a track position error signal indicating the light-beam's position relative to the centerline of the track.

11. The differential phase error detector as recited in claim 8, wherein:
(a) the correlator computes a first positive correlation value corrP$_1(\Delta+)$ and a second positive correlation value corrP$_2(\Delta-)$ where $\Delta+>\Delta-$;
(b) the correlator computes a first negative correlation value corrN$_1(\Delta+)$ and a second negative correlation value corrN$_2(\Delta-)$;
(c) the correlator adds corrP$_1(\Delta+)$ to corrP$_2(\Delta-)$ to generate the correlation corrP$(\Delta)$; and
(d) the correlator adds corrN$_1(\Delta+)$ to corrN$_2(\Delta-)$ to generate the correlation corrN$(\Delta)$.

12. The differential phase error detector as recited in claim 11, wherein the position error signal is generated as a difference between corrP$(\Delta)$ and corrN$(\Delta)$.

13. The differential phase error detector as recited in claim 11, wherein $\Delta+$ and $\Delta-$ are programmably adjusted in order to maximize a correlation value relative to corrP$_1(\Delta+)$, corrP$_2(\Delta-)$, corrN$_1(\Delta+)$, corrN$_2(\Delta-)$, corrP$(\Delta)$ and corrN$(\Delta)$.

14. The differential phase error detector as recited in claim 1, wherein the position signals S1 and S2 are generated by summing quadrant analog signals generated by the photodetector, further comprising:
(a) an analog filter for filtering a quadrant analog signal to generate a filtered quadrant analog signal;
(b) an analog-to-digital converter for converting the filtered quadrant analog signal to a quadrant digital signal; and
(c) a summing circuit for summing quadrant digital signals.

15. In an optical storage device for recording digital data, a differential method of detecting a phase error for generating a tracking error signal in response to a light-beam reflected off of an optical storage medium, the light-beam generated by an optical transducer, the method comprising the steps of:
(e) detecting a first and second position signals S1 and S2 from the light-beam; and
(f) correlating the first and second position signals S1 and S2 to generate a position error signal indicative of the optical transducer's position relative to a centerline of a selected track
wherein:
the first and second position signals S1 and S2 are discrete-time signals S1(n) and S2(n); and
the step of correlating comprises the step of computing a correlation corr$(\Delta)$ according to $$corr(\Delta) = \sum_{1}^{L} S1(n)S2(n-\Delta)$$

where L is an integer representing the length of the correlation and $\Delta$ is an integer representing a time shift between S1(n) and S2(n).

16. The differential method of detecting a phase error for generating a tracking error signal as recited in claim 15, wherein:
(a) the step of detecting the first and second position error signals S1 and S2 comprises the steps of generating the first position signal S1 as a function of a first two quadrants of a four quadrant photodetector and generating the second position signal S2 as a function of a second two quadrants of the four quadrant photodetector;
(b) the digital data is recorded by altering a characteristic of the optical storage medium such that the light beam reflecting off the altered medium generates an image that passes over the photodetector; and
(c) a phase offset occurs between the first and second position signals S1 and S2 when the image passes disproportionately over the four quadrants.

17. The differential method of detecting a phase error for generating a tracking error signal as recited in claim 15, wherein:

(g) the step of correlating comprises the steps of computing a first correlation value $corr(\Delta)_1$ and a second correlation value $corr(\Delta)_2$; and (h) the position error signal is generated as a function of $corr(\Delta)_1$ and $corr(\Delta)_2$.

18. The differential method of detecting a phase error for generating a tracking error signal as recited in claim 17, wherein the position error signal is generated as a difference between $corr(\Delta)_1$ and $corr(\Delta)_2$.

19. The differential method of detecting a phase error for generating a tracking error signal as recited in claim 15, further comprising the step of programmable adjusting $\Delta$ to maximize the correlation $corr(\Delta)$.

20. The differential phase error detector as recited in claim 15, wherein the position signals S1 and S2 are generated by summing quadrant analog signals generated by a quadrant photodetector, further comprising:

(a) an analog filter for filtering a quadrant analog signal to generate a filtered quadrant analog signal;

(b) an analog-to-digital converter for converting the filtered quadrant analog signal to a quadrant digital signal; and (c) a summing circuit for summing quadrant digital signals.

21. In an optical storage device for recording digital data, a differential phase error detector for generating a tracking error signal in response to a light-beam reflected off of an optical storage medium, the light-beam generated by an optical transducer, the differential phase error detector comprising:

(a) a photodetector, responsive to the light-beam, for generating a first and second position signals S1(n) and S2(n); and (b) a correlator for correlating the discrete-time position signals S1(n) and S2(n) to generate a position error signal indicative of the optical transducer's position relative to a centerline of a selected track, the correlator computing a correlation value $corr(\Delta)$ according to:

$$corr(\Delta) = \sum_{1}^{L} S1(n)S2(n - \Delta)$$

where L is an integer representing the length of the correlation and $\Delta$ is an integer representing a time shift between S1(n) and S2(n).

22. The differential phase error detector as recited in claim 21, wherein $\Delta$ is programmably adjusted in order to maximize a correlation value.

23. The differential phase error detector as recited in claim 21, further comprising a quadrature signal generator for generating a quadrature signal for use in detecting when the light-beam cross over a track during a seek operation.

24. The differential phase error detector as recited in claim 23, wherein the quadrature signal comprises:

(a) a centerline signal indicating when the light-beam is within a predetermined distance from a centerline of the track; and (b) a track position error signal indicating the light-beam's position relative to the centerline of the track.

25. In an optical storage device for recording digital data, a differential phase error detector for generating a tracking error signal in response to a light-beam reflected off of an optical storage medium, the light-beam generated by an optical transducer, the differential phase error detector comprising:

(i) a photodetector, responsive to the light-beam, for generating four quadrant analog signals;

(j) at least one sampling device for sampling the four quadrant analog signals to generate four quadrant discrete signals;

(k) a first summing circuit for summing a first two of the four quadrant discrete signals to generate a first discrete position signal S1(n);

(l) a second summing circuit for summing a second two of the four quadrant discrete signals to generate a second discrete position signal S2(n); and (m) a discrete time phase offset detector for detecting a phase offset between the first and second discrete position signals S1(n) and S2(n)

wherein:

the discrete time phase offset detector comprises a correlator for correlating the first and second discrete position signals to generate the phase offset; and the correlator computes a correlation value $corr(\Delta)$ according to:

$$corr(\Delta) = \sum_{1}^{L} S1(n)S2(n - \Delta)$$

where L is an integer representing the length of the correlation and $\Delta$ is an integer representing a time shift between S1(n) and S2(n).

26. The differential phase error detector as recited in claim 25, wherein the four quadrant discrete signals are binary signals and the first and second summing circuits are OR gates.

27. The differential phase error detector as recited in claim 25, further comprising a quadrature signal generator for generating a quadrature signal for use in detecting when the light-beam cross over a track during a seek operation.

\* \* \* \* \*